Nov. 8, 1938.   J. DAMON   2,135,968
INTERVISUAL MURAL
Filed Aug. 27, 1938
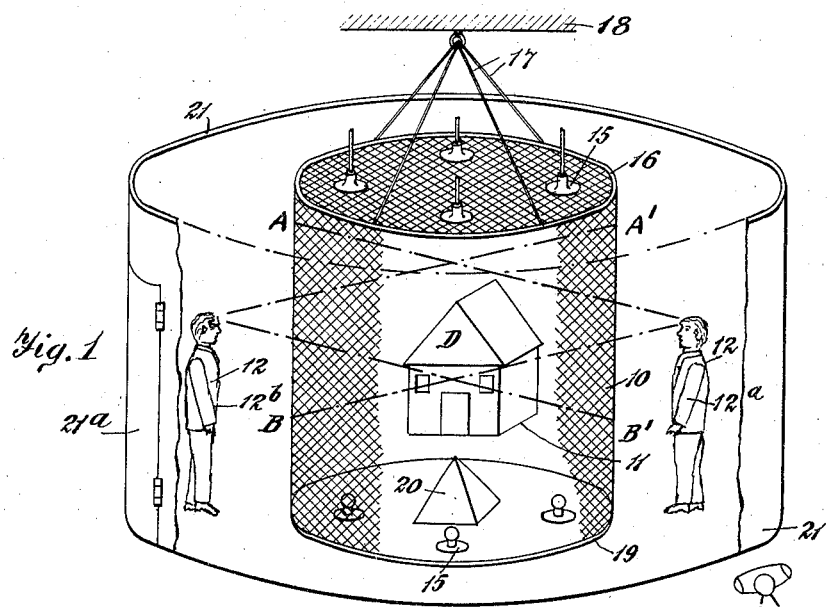
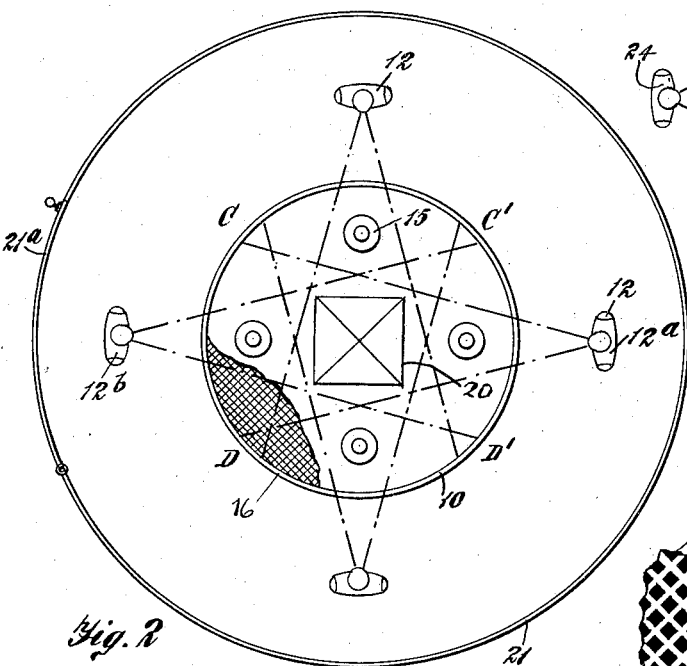
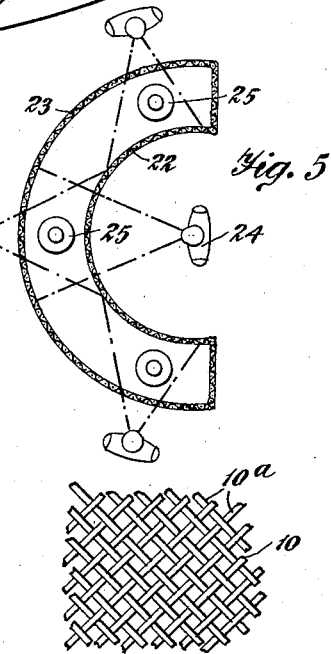
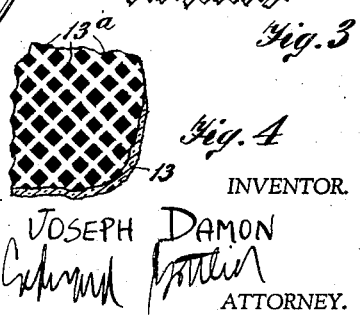
INVENTOR.
BY  JOSEPH DAMON
ATTORNEY.

Patented Nov. 8, 1938

2,135,968

UNITED STATES PATENT OFFICE 2,135,968

INTERVISUAL MURAL

Joseph Damon, Mount Vernon, N. Y.

Application August 27, 1938, Serial No. 227,118

8 Claims. (Cl. 40—130)

This invention relates to new and useful improvements in an inter-visual mural.

The invention has for an object the construction of a transparent screen formed from a plurality of opaque elements slightly spaced from each other, a mural or the like painted or imprinted on the rear sides of said opaque elements, and an arrangement whereby one may look through a section of the screen and see the rear side of another section of the screen and view the mural or the like material painted or imprinted thereon.

More specifically, the invention contemplates to so shape the screen that a person may stand to the front of one portion thereof, and when looking through this portion, see the rear of another portion of the screen. The invention contemplates the provision of illumination in such a manner that a person may see the mural or other material upon the rear of the screen, and at the same time be limited from looking through the rear of the screen whch, as before stated, is composed of transparent material.

The invention contemplates making use of various types of screens embodying the fundamental requirements of this invention. Such screens may comprise gauze, metal or fabric or any suitable composition material, glass, or any other transparent material.

A further object of the invention relates to specific means for properly supporting the screen. It is proposed that the screen be supported in a manner so that it is of a third dimensional triangle, quadrilateral, pentagon, hexagon, heptagon, octagon, nonagon, decagon, or other multi-sided polygon, or an oval. Additional shapes may be a sphere, a third dimensional egg-shaped figure, a cone with end up, or two cones point to point, base to base, or any other combination, or a polyhedron of any number of sides.

With respect to the proper illumination of the screen the invention contemplates arrangements by which the illumination is supplied from the top, or the bottom, or a combination of these directions or other suitable directions.

Another object of the invention is the construction of a device as described which is simple and durable in operation and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a perspective view of an inter-visual mural constructed according to one embodiment of this invention.

Fig. 2 is a plan view of Fig. 1.

Fig. 3 is a fragmentary enlarged detailed view of a portion of the screen shown in Fig. 1.

Fig. 4 is a fragmentary perspective view of another screen capable of being used in this invention.

Fig. 5 is a horizontal sectional view of an inter-visual mural of a modified form embodying the invention.

The inter-visual mural, according to this invention, includes a transparent screen 10 formed from a plurality of opaque elements 10a slightly spaced from each other. A mural or the like is painted or imprinted on the rear sides of the opaque elements 10a. The screen 10 is so shaped that one or more persons 12 may look at the front side of the screen at one section thereof and see through the screen and view the rear side of another section of the screen. A means is provided for properly illuminating the device to obtain the visibility stated.

The screen 10 may be of gauze, metal or fabric, or any other composition. The elements, as shown in Figs. 1 and 3 of the screen, comprise woven filaments. Because of the spacing between these filaments it is possible to look through the screen. The mural 11 is painted upon the rear side of the screen, particularly on the filaments of the screen, so that the openings between the filaments are not obstructed.

In Fig. 4 another screen has been shown which may be used in this invention. This screen comprises a plate of glass 13 imprinted with a plurality of opaque elements 13a slightly spaced from each other. These elements may be in the form of filaments, dots, or other shapes. The object is to provide spaces between the opaque portions between which one may look. The mural must be painted upon the rear side of the opaque portions so as not to interfere with the vision of the screen.

One method of constructing the glass screen to meet the requirements would be to place a screen of material on the glass, to paint the mural upon the screen and face of the glass, and then to pull off the screen so that there are blank spaces on the glass through which one may look. The mural is painted upon the glass between or around these blank spaces.

The screen 10 (or 13) may be formed in the shape of a hollow cylinder as shown in Fig. 1. The interior of this hollow cylinder is adapted to be illuminated by lamps 15 arranged upon the top and bottom ends thereof. In order that the screen 10 be held tightly it is supported at the top upon a hoop 16. This hoop is supported by several wires or other holding elements 17 to a ceiling 18 or other support. The bottom of the screen 10 is secured to a bottom hoop 19. While this particular manner has been shown to support the screen it should be borne in mind that there are many other ways which will be readily apparent to those skilled in the art.

The screen 10 is illustrated of hollow cylindrical form, but as pointed out in the objects of this specification, it may be of various other forms. Within the compass of the hollow cylindrical form of the screen 10 there may also be a solid object 20 which is worked into the ornamentation of the mural, or it may be independently decorative.

People may stand around the screen 10, as illustrated in Figs. 1 and 2, and look through the screen portion to the front of them and view the opaque rear face of the screen and thus the mural or other material thereon. For illustrative purposes Fig. 1 has been shown as a person would see the device when looking from the front. It should be noted that a portion of the mural 11 and the object 20 is clearly viewable, and the front portion of the screen is thus not readily seen.

It is pointed out that a person at one side of the screen 10 will not be able to see a person directly on the other side. For example, the person 12a in Fig. 1 cannot see the person 12b in this figure, and likewise the person 12b cannot see the person 12a. The line of vision of the person 12a is such that an area of the screen between the letters AB in Fig. 1 and CD in Fig. 2 will only be viewable. Similarly, the person 12b will see an area A'B' in Fig. 1 and an area C'D' in Fig. 2.

In order to prevent the silhouetting of a person upon the outer face of the screen 10, an opaque wall 21 is provided around the screen, properly spaced therefrom, so that persons may walk in the area therebetween. The wall 21 is provided with a door 21a to give access to the path between the wall and the screen.

In Fig. 5 another embodiment of the invention has been disclosed to illustrate another shape of the screen so that it becomes quite clear that many additional and varied shapes may be used. In this form of the invention there is a screen formed from parallel half cylinders 22 and 23. The inner faces of the screens 22 and 23 are imprinted or painted with a mural. People 24 may walk around the screen and look through that section of the screen nearest them and view the inner face of the section farthest from them and thus see the mural painted thereon. Of course the area between the screen sections 22 and 23 is suitably illuminated by lamps 25. The dot and dash lines in this figure represent lines of vision of the various people illustrated. It should be understood that while each of the persons illustrated may see the mural in the section of the screen most remote from themselves, they cannot completely look through the screen and see a person on the opposite side.

Another arrangement might be one in which the people stand still and the screen is mounted on a turn table or other similar support for turning around.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit or the scope of the appended claims.

Having thus described my invention, what I claim as new and desire to secure by United States Letters Patent is:

1. An inter-visual mural, comprising a transparent screen formed from a plurality of opaque elements slightly spaced from each other, a mural or the like painted or imprinted on the rear sides of said opaque elements, said screen being shaped so that a person may look through the front side of said screen at one section thereof and see the rear side at another section, and means for illuminating the rear side of said screen.

2. An inter-visual mural, comprising a transparent screen formed from a plurality of opaque elements slightly spaced from each other, a mural or the like painted or imprinted on the rear sides of said opaque elements, said screen being shaped so that a person may look through the front side of said screen at one section thereof and see the rear side at another section, and means for illuminating the rear side of said screen, said screen being constructed of wire, gauze, fabric, or other filament material.

3. An inter-visual mural, comprising a transparent screen formed from a plurality of opaque elements slightly spaced from each other, a mural or the like painted or imprinted on the rear sides of said opaque elements, said screen being shaped so that a person may look through the front side of said screen at one section thereof and see the rear side at another section, and means for illuminating the rear side of said screen, said screen comprising glass with small transparent areas in adjacent opaque areas.

4. An inter-visual mural, comprising a transparent screen formed from a plurality of opaque elements slightly spaced from each other, a mural or the like painted or imprinted on the rear sides of said opaque elements, said screen being shaped so that a person may look through the front side of said screen at one section thereof and see the rear side at another section, means for illuminating the rear side of said screen, and an object or objects mounted within the compass of the screen.

5. An inter-visual mural, comprising a transparent screen formed from a plurality of opaque elements slightly spaced from each other, a mural or the like painted or imprinted on the rear sides of said opaque elements, said screen being shaped so that a person may look through the front side of said screen at one section thereof and see the rear side at another section, and means for illuminating the rear side of said screen, said screen being of hollow cylindrical form.

6. An inter-visual mural, comprising a transparent screen formed from a plurality of opaque elements slightly spaced from each other, a mural or the like painted or imprinted on the rear sides of said opaque elements, said screen being shaped so that a person may look through the front side of said screen at one section thereof and see the rear side at another section, means for illuminating the rear side of said screen, said screen being of double-walled hollow semi-cylindrical form.

7. An inter-visual mural, comprising a transparent screen formed from a plurality of opaque elements slightly spaced from each other, a mural or the like painted or imprinted on the rear sides of said opaque elements, said screen being shaped so that a person may look through the front side of said screen at one section thereof and see the rear side at another section, and means for illuminating the rear side of said screen, said screen being of relatively soft material, hoops attached to the top and bottom of the perimeters of said screen, and means for supporting said hoops to support the screen.

8. An inter-visual mural, comprising a transparent screen formed from a plurality of opaque elements slightly spaced from each other, a mural or the like painted or imprinted on the rear sides of said opaque elements, said screen being shaped so that a person may look through the front side of said screen at one section thereof and see the rear side at another section, and means for illuminating the rear side of said screen, comprising lamps indirectly lighting the rear of said screen.

JOSEPH DAMON.